(12) United States Patent
Lim (10) Patent No.: US 11,758,150 B2
(45) Date of Patent: Sep. 12, 2023

(54) METHOD AND APPARATUS FOR ENCODING/DECODING A VIDEO SIGNAL, AND A RECORDING MEDIUM STORING A BITSTREAM

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 28 days.

(21) Appl. No.: 17/343,006

(22) Filed: Jun. 9, 2021

(65) Prior Publication Data

US 2021/0392339 A1   Dec. 16, 2021

(30) Foreign Application Priority Data

Jun. 10, 2020 (KR) .................. 10-2020-0070335
Jun. 8, 2021 (KR) .................. 10-2021-0074102

(51) Int. Cl.
*H04N 19/105* (2014.01)
*H04N 19/159* (2014.01)
*H04N 19/176* (2014.01)
*H04N 19/132* (2014.01)

(52) U.S. Cl.
CPC ......... *H04N 19/159* (2014.11); *H04N 19/105* (2014.11); *H04N 19/132* (2014.11); *H04N 19/176* (2014.11)

(58) Field of Classification Search
CPC .. H04N 19/159; H04N 19/105; H04N 19/132; H04N 19/176
See application file for complete search history.

(56) References Cited

U.S. PATENT DOCUMENTS

2014/0198855 A1* 7/2014 Sole Rojals ........... H04N 19/59
 375/240.16
2021/0289197 A1* 9/2021 Ko ....................... H04N 19/182

\* cited by examiner

*Primary Examiner* — Hesham K Abouzahra
(74) *Attorney, Agent, or Firm* — IP Legal Services, LLC (57) ABSTRACT

An image decoding method according to the present disclosure includes determining a reference pixel line of a current block, determining an intra prediction mode of the current block and deriving a prediction sample of the current block based on the intra prediction mode and a reference pixel included in the reference pixel line. In this case, the prediction sample is determined based on a prediction angle of the intra prediction mode and an inverse-angle variable derived based on the prediction angle. And when the prediction angle has a predefined value, the inverse-angle variable is set as a default value.

3 Claims, 4 Drawing Sheets

METHOD AND APPARATUS FOR ENCODING/DECODING A VIDEO SIGNAL, AND A RECORDING MEDIUM STORING A BITSTREAM

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including an inter prediction technique of predicting a pixel value included in a current picture from a previous or subsequent picture of the current picture; an intra prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

A purpose of the present disclosure is to provide a method and a device of effectively performing intra prediction in encoding/decoding a video signal.

Technical effects of the present disclosure may be non-limited by the above-mentioned effects, and other unmentioned technical effects may be clearly understood from the following description by those having ordinary skill in the technical field to which the present disclosure pertains.

Technical Solution

An image decoding method according to the present disclosure includes determining a reference pixel line of a current block, determining an intra prediction mode of the current block and deriving a prediction sample of the current block based on the intra prediction mode and a reference pixel included in the reference pixel line. In this case, the prediction sample may be determined based on a prediction angle of the intra prediction mode and an inverse-angle variable derived based on the prediction angle. And when the prediction angle has a predefined value, the inverse-angle variable may be set as a default value.

An image encoding method according to the present disclosure includes determining a reference pixel line of a current block, determining an intra prediction mode of the current block and deriving a prediction sample of the current block based on the intra prediction mode and a reference pixel included in the reference pixel line. In this case, the prediction sample may be determined based on a prediction angle of the intra prediction mode and an inverse-angle variable derived based on the prediction angle. And when the prediction angle has a predefined value, the inverse-angle variable may be set as a default value.

In an image decoding/encoding method according to the present disclosure, reference pixels included in the reference pixel line may be arranged in a 1D array based on the inverse-angle variable.

In an image decoding/encoding method according to the present disclosure, whether the inverse-angle variable will be updated or not may be determined based on whether a value of the prediction angle is a predefined value or is in a predefined range.

In an image decoding/encoding method according to the present disclosure, the inverse-angle variable may keep the default value when it is determined not to update the inverse-angle variable.

In an image decoding/encoding method according to the present disclosure, the default value may be 0.

Technical Effects

According to the present disclosure, encoding/decoding efficiency may be improved by providing an improved intra prediction method.

Effects obtainable from the present disclosure may be non-limited by the above-mentioned effect, and other unmentioned effects may be clearly understood from the following description by those having ordinary skill in the technical field to which the present disclosure pertains.

DESCRIPTION OF DIAGRAMS

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

Figure 1:
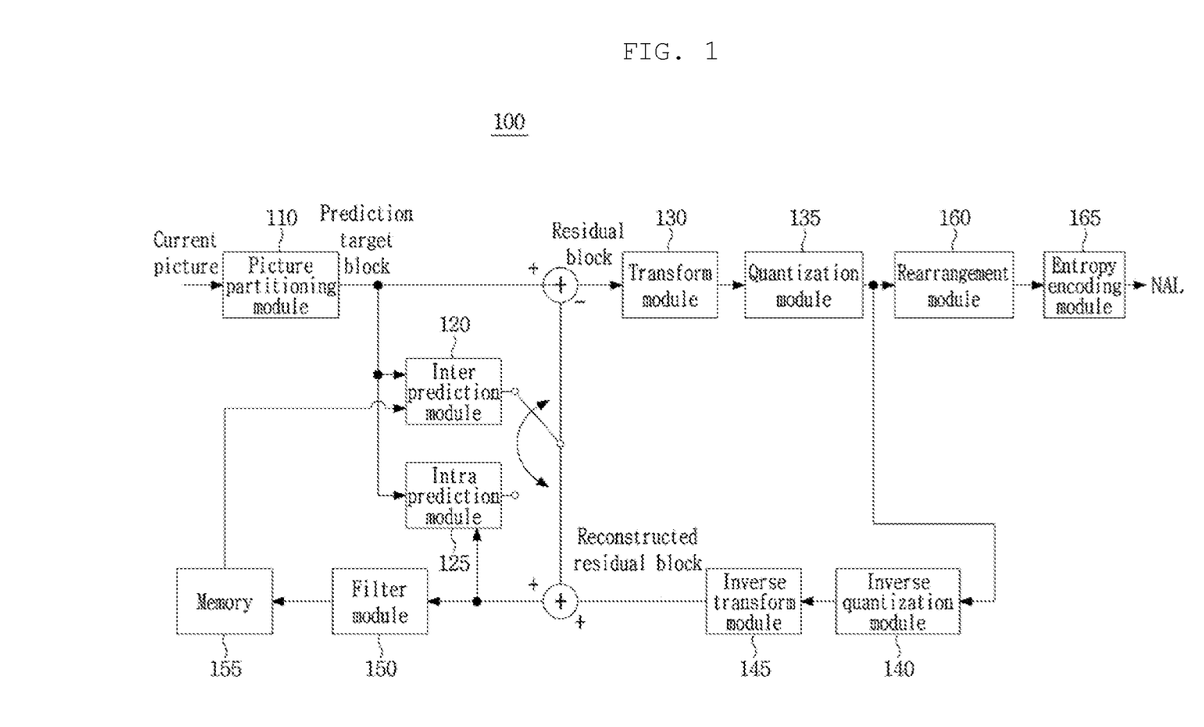
FIG. 1 is a block diagram illustrating a device for encoding a video according to an embodiment of the present disclosure.

FIG. 1 is a block diagram illustrating a device for encoding a video according to an embodiment of the present disclosure.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video, and does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be partitioned into a plurality of constitutional parts to perform each function. The embodiment where each constitutional part is combined and the embodiment where one constitutional part is partitioned are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of a plurality of coding units, prediction units, and transform units, and may encode a picture by selecting one combination of coding units, prediction units, and transform units with a predetermined criterion (e.g., cost function).

For example, one picture may be partitioned into a plurality of coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so that one prediction unit of prediction units partitioned in a single coding unit have a different shape and/or size from other prediction unit.

In the intra prediction, the transform unit and the prediction unit may be set to be the same. In this case, after dividing the coding unit into a plurality of transform units, intra prediction may be performed for each transform unit. The coding unit may be divided in a horizontal direction or a vertical direction. The number of transform units generated by dividing the coding unit may be 2 or 4 depending on the size of the coding unit.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit performing prediction may be different from the processing unit for which the prediction method and detailed content is determined. For example, the prediction method, the prediction mode, etc. may be determined on the basis of the prediction unit, and prediction may be performed on the basis of the transform unit. A residual value (residual block) between the generated prediction block and an original block may be input to the transform module 130. Also, prediction mode information, motion vector information, etc. used for prediction may be encoded with the residual value in the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel on the basis of a ¼ pixel. In the case of chroma signals, a 4-tap DCT-based interpolation filter having different filter coefficient may be used to generate pixel information of an integer pixel or less than an integer pixel on the basis of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value on the basis of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction unit 125 may generate a prediction block based on reference pixel information, which is pixel information in the current picture. Reference pixel information may be derived from a selected one of a plurality of reference pixel lines. The N-th reference pixel line among the plurality of reference pixel lines may include left pixels having an x-axis difference of N from a top-left pixel in the current block and top pixels having a y-axis difference of N from the top-left pixel of the current block. The number of reference pixel lines that the current block can select may be 1, 2, 3, or 4.

If the neighboring block of the current prediction unit is a block that has performed inter prediction and the reference pixel is a pixel resulting from performing inter prediction, the reference pixel included in the block that has performed inter prediction may be replaced with reference pixel information of the neighboring block that has performed intra prediction. That is, when the reference pixel is not available, the reference pixel information that is not available may be replaced with at least one information of the available reference pixels.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when a size of the prediction unit is the same as a size of the transform unit, intra prediction may be performed on the prediction unit based on pixels positioned at the left, the top left, and the top of the prediction unit.

In the intra prediction method, a prediction block may be generated after applying a smoothing filter to a reference pixel according to a prediction mode. Whether to apply the smoothing filter may be determined according to the selected reference pixel line.

In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on a size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture on the basis of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be partitioned into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
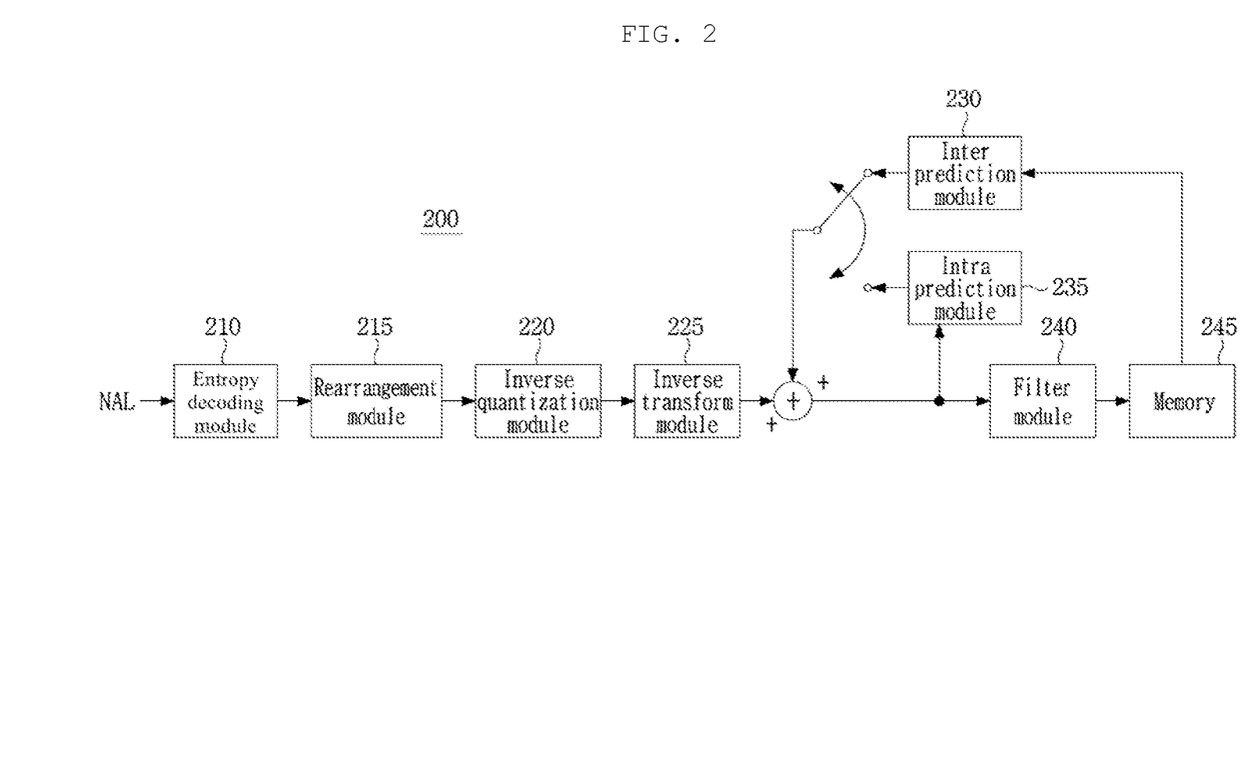
FIG. 2 is a block diagram illustrating a device for decoding a video according to an embodiment of the present disclosure.

FIG. 2 is a block diagram illustrating a device for decoding a video according to an embodiment of the present disclosure.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on a plurality of pieces of information, such as the prediction method, a size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when a size of the prediction unit is the same as a size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may partition a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on a type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, the current block represents a block to be encoded/decoded, and may represent a coding tree block (or coding tree unit), a coding block (or coding unit), a transform block (or transform unit), and a prediction block (or a prediction unit) or a block to which the in-loop filter is applied, etc. according to an encoding/decoding step. In this specification, 'unit' denotes a basic unit for performing a specific encoding/decoding process, and 'block' may denote a pixel array having a predetermined size. Unless otherwise specified, 'block' and 'unit' may be used interchangeably. For example, in an embodiment to be described later, it may be understood that the coding block (coding block) and the coding unit (coding unit) have the same meaning as each other.

Figure 3:
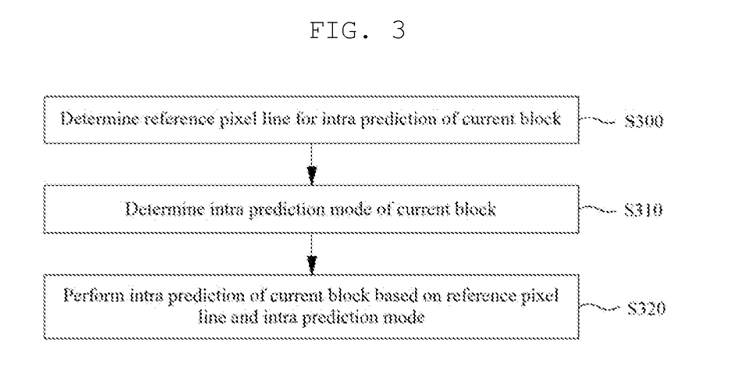
FIG. 3 shows an intra prediction method according to the present disclosure.

FIG. 3 shows an intra prediction method according to the present disclosure.

In reference to FIG. 3, a reference pixel line for intra prediction of a block which is currently encoded/decoded (hereinafter, referred to as a current block) may be determined S300.

A reference pixel line according to the present disclosure may belong to a surrounding block adjacent to a current block. The surrounding block may include at least one of a left block, a top block, a top-left block, a bottom-left block, a top-right block, a right block, a bottom-right block or a bottom block. In addition, a reference pixel line may belong to a spatial block which belongs to the same picture as a current block, but is not adjacent to a current block or may belong to a temporal block which belongs to a picture different from a current block. In this case, a temporal block may be a block at the same position as a surrounding block of the above-described current block.

There may be a limit that the reference pixel line belongs only to pre-encoded/decoded block before a current block. Or, the reference pixel line may belong to a block which is encoded/decoded after a current block. In this case, a padding process may be further accompanied.

The reference pixel line may be determined as any one of a plurality of reference pixel line candidates. A plurality of reference pixel line candidates may include at least one of a first reference pixel line adjacent to a current block, a second reference pixel line adjacent to the first reference pixel line, . . . , the n-th reference pixel line adjacent to the (n−1)-th reference pixel line. In this case, n may be an integer such as 2, 3, 4, or more.

In an example, a plurality of reference pixel line candidates may be configured with a first to fourth reference pixel line, may be configured only with a first to third reference pixel line, or may be configured only with a first and third reference pixel lines.

Any one of the above-described first to n-th reference pixel line may be selectively used and for it, information for specifying a position of a reference pixel line may be used. The information may be signaled from an encoding device. In an example, index information indicating index of one among a plurality of reference pixel lines may be signaled in a bitstream. refIdx, an index of a reference pixel line of a current block, may be determined by the index information. When a value of refIdx, an index of a reference pixel line, is 0, it indicates a reference pixel line adjacent to a current block. When a value of refIdx, an index of a reference pixel line, is n, it indicates that a reference pixel line is apart from the adjacent reference pixel line by n lines.

Alternatively, refIdx, an index of each reference pixel line, may be determined by considering adjacency with a current block. In an example, when one of 3 reference pixel lines is selected, an index of a reference pixel line which is most adjacent to a current block among 3 reference pixel lines may be set to be 0 and an index of a reference pixel line which is farthest from a current block may be set to be 2. An index of a reference pixel line between the two reference pixels may be set to be 1.

Alternatively, a reference pixel line of a current block may be determined based on a predetermined encoding parameter.

The encoding parameter may include at least one of a size, a shape or a position of a block, a component type (Y/Cb/Cr), a prediction mode (intra/inter), an intra prediction mode or whether the intra prediction mode is a non-directional mode. In this case, a block may mean a current block and/or a surrounding block, or may mean a coding block, a prediction block and/or a transform block. In addition, the number of reference pixel line candidates which may be used by a current block may be variably determined based on the above-described encoding parameter, or information for specifying the number may be further signaled.

In reference to FIG. 3, an intra prediction mode of a current block may be determined S310.

Figure 4:
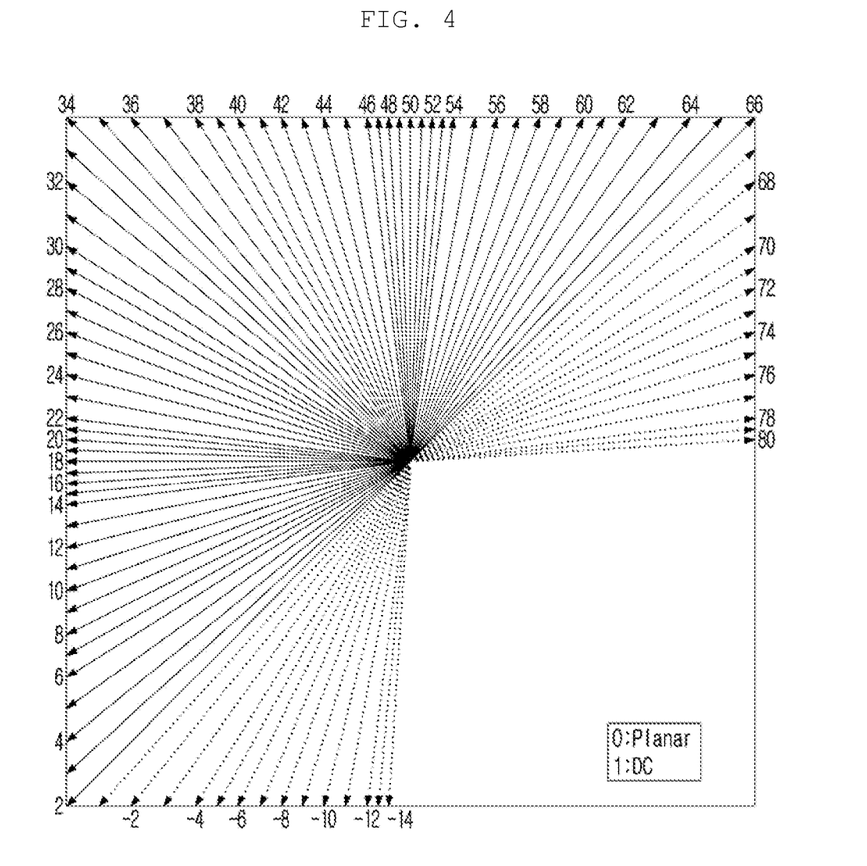
FIG. 4 shows a predefined intra prediction mode.

An intra prediction mode of a current block may be determined as one of intra prediction modes which are predefined in an encoding/decoding device. The predefined intra prediction mode may be configured with 2 non-directional modes and 65 directional modes as shown in FIG. 4.

A directional mode may include at least one of a planar mode or a DC mode, and a nondirectional mode may include a mode having a predetermined angle/direction (e.g., a vertical mode, a horizontal mode, a diagonal mode, etc.)

In reference to FIG. 3, intra prediction of a current block may be performed based on the determined reference pixel line and an intra prediction mode S320.

In other words, a pixel corresponding to the determined intra prediction mode among reference pixel lines may be specified as a reference pixel and a prediction pixel may be derived by using a specified reference pixel.

A prediction pixel of a current block may be derived by referring to a reference pixel. In this case, a reference pixel referenced to derive a prediction pixel may be determined based on a direction of an intra prediction mode.

Figure 5:
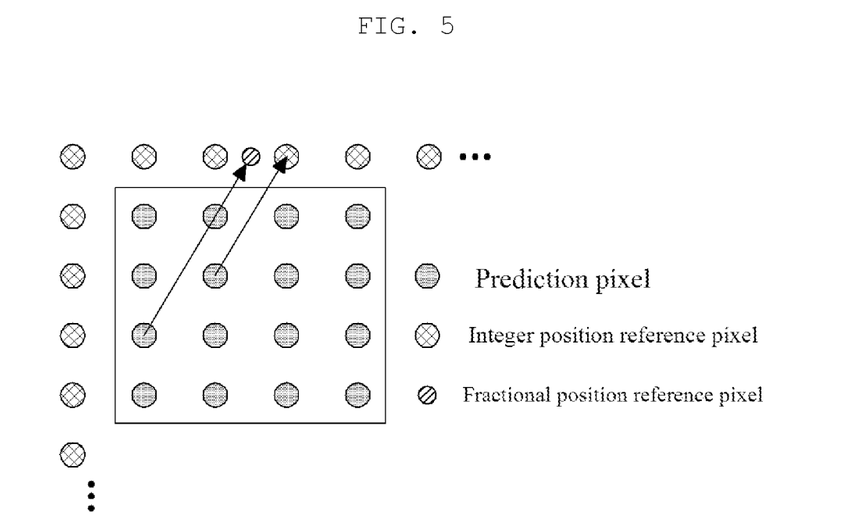
FIG. 5 is an example of a case in which a directional intra prediction mode whose index is 58 is selected.

FIG. 5 is an example of a case in which a directional intra prediction mode whose index is 58 is selected.

A reference pixel around a current block may be determined based on a direction of an intra prediction mode to derive a prediction pixel of a current block.

In this case, when a position specified by a direction of an intra prediction mode is not an integer position, a reference pixel at a fractional position may be generated by interpolating reference pixels. A value of a generated reference pixel at a fractional position is set as a prediction pixel at a corresponding position.

A type of an interpolation filter used to generate a reference pixel at a fractional position may be selected among a plurality of interpolation filter types. The plurality of interpolation filter types may include a Cubic-convolution filter and a Gaussian filter.

To select one of a plurality of interpolation filter types, an internal variable may be defined in an encoder and a decoder. An internal variable may be a flag, filterFlag, specifying one of 2 filter type candidates or an index, filterIdx, specifying one of a plurality of filter type candidates. In an example, when a value of the internal variable, filterFlag, is 0, it represents that a Cubic-convolution filter is selected and when a value of the internal variable, filterFlag, is 1, it represents that a Gaussian filter is selected.

In the after-described embodiment, it is assumed that an internal variable is a flag, filterFlag, indicating one of 2 filter type candidates.

An internal variable, filterFlag, may be derived based on at least one of whether a smoothing filter is applied to a reference pixel, an index of a reference pixel line, an intra prediction mode or a size of a block.

In an example, when a smoothing filter is applied to a reference pixel, or when refIdx, an index of a reference pixel line, is not 0, a value of an internal variable, filterFlag, may be set to be 1.

When the conditions are not satisfied, a value of an internal variable, filterFlag, may be derived by considering an intra prediction mode of a current block and a size of a current block. First, minDistVerHor, a variable representing a difference value between an intra prediction mode of a current block and an intra prediction mode in a horizontal direction or an intra prediction mode in a vertical direction, may be derived. Concretely, the minimum value of a difference value between an index of an intra prediction mode of a current block and an index of an intra prediction mode in a vertical direction and a difference value between an index of an intra prediction mode of a current block and an index of an intra prediction mode in a horizontal direction may be set as a value of a variable, minDistVerHor. In other words, as in the following Equation 1, a value of a variable, minDistVerHor, may be derived.

$$\text{minDistVerHor} = \text{Min}(\text{Abs}(\text{CurrIntraPredMode}-50), \text{Abs}(\text{CurrentIntraPredMode}-18)) \quad \text{[Equation 1]}$$

In the Equation 1, a variable, CurrIntraPredMode, represents an index of an intra prediction mode of a current block. '50' is an index of an intra prediction mode in a vertical direction and '18' is an index of an intra prediction mode in a horizontal direction. Min(A, B) is a function which outputs a smaller value of A and B, and abs (X) is a function which outputs an absolute value of X.

A value of a variable, filterFlag, may be derived by comparing a variable, minDistVerHor, with a threshold value.

In this case, a threshold value may be adaptively determined based on a size of a current block. In an example, Table 1 represents a mapping relationship between nTbS, a size of a current block, and intraHorVerDistThres, a threshold value.

TABLE 1

|  | nTbS = 2 | nTbS = 3 | nTbS = 4 | nTbS = 5 | nTbS = 6 | nTbS = 7 |
|---|---|---|---|---|---|---|
| intraHorVerDIstThres[nTbS] | 24 | 14 | 2 | 0 | 0 | 0 | nTbS, a variable representing a size of a current block, may be derived based on at least one of a width or a height of a current block. Equation 2 represents an example of deriving a variable, nTbS.

$$nTbS = (\text{Log}_2(nTbW) + \text{Log}_2(nTbH)) >> 1 \quad \text{[Equation 2]}$$

In the Equation 2, a variable, nTbW, and a variable, nTbH, represent a width and a height of a current block, respectively.

When a variable, minDistVerHor, is greater than a variable, intraHorVerDistThres[nTbS], a value of a variable, filterFlag, may be set to be 1. On the other hand, when a variable, minDistVerHor, is smaller than a variable, intraHorVerDistThres[nTbS], a value of a variable, filterFlag, may be set to be 0.

Alternatively, a value of a variable, filterFlag, may be derived based on information signaled in a bitstream (e.g., a filter type flag).

A filter type may be determined independently for each color component. In other words, a filter type of a luma component and a filter type of a chroma component may be independently determined.

Alternatively, an interpolation filter type for a chroma component may set to be the same as a luma component.

Alternatively, a filter type of a chroma component may set to be the same as a luma component, but a filter characteristic therefor may set to be different from the luma component. In this case, a filter characteristic represents at least one of the number of filter taps or filter coefficients.

Alternatively, for a luma component, one of a 4-tap Gaussian filter and Cubic-convolution filter may be used, but for a color component, 2-tap filter that a weight is determined based on a position of a fractional pixel may be used.

According to an intra prediction mode of a current block, a prediction angle may be different. In an example, Table 2 represents a prediction angle per intra prediction mode.

$$invAngle = \text{Round}\left(\frac{512 * 32}{intraPredAngle}\right) \quad \text{[Equation 3]}$$

A variable, invAngle, may be referred to as an inverse-angle variable. According to a value of the variable, invAngle, when reference sample arrays in a 2D shape are arranged in a 1D shape, whether left reference samples are rearranged in a horizontal direction or whether top reference samples are rearranged in a vertical direction may be determined.

A prediction pixel may be derived by additionally deriving at least one of ref[x], a reference pixel array generated by arranging reference pixels in a 1D shape, iIdx, a variable for specifying a reference pixel in a reference pixel array, and iFact, a variable for specifying a position of a reference pixel (e.g., an integer position or a fractional position), except for the above-described variables.

In this case, deriving method of the variables may be different between when an intra prediction mode of a current block is equal to or greater than a top-left diagonal direction mode (i.e., an intra prediction mode whose index is 34) and when it is not (i.e., when an index of an intra prediction mode is smaller than 34). Accordingly, a method of deriving a prediction pixel will be described separately when an intra prediction mode of a current block is equal to or greater than a top-left diagonal direction mode and when it is not.

First, a method of deriving a prediction pixel will be described when an index of an intra prediction mode of a current block is equal to or greater than a top-left diagonal direction mode (i.e., when predModeIntra is equal to or greater than 34).

Reference pixels belonging to a reference pixel line may be stored in ref[x], a reference pixel buffer, as in the following Equation 4.

$$ref[x] = p[-1-refIdx+x][-1-refIdx], \text{ with } x = 0 \ldots nTbW+refIdx+1 \quad \text{[Equation 4]}$$

TABLE 2

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 |  |  |  |  |  |  |  |  |  |
| intraPredAngle | 73 | 86 | 102 | 128 | 171 | 256 | 341 | 512 |  |  |  |  |  |  |  |  |  |

In Table 2, a variable, predModeIntra, represents an index of an intra prediction mode and a variable, intraPredAngle, represents a prediction angle.

invAngle, a variable for specifying a reference pixel, may be derived based on an intra prediction angle. In an example, a variable, invAngle, may be derived based on the following Equation 3.

In Equation 4, ref[x] represents a value of a reconstructed pixel stored at an x position in a reference pixel buffer.

In Equation 4, p[a][b] represents a reconstructed pixel at a position of (a, b) or a reconstructed pixel to which a smoothing filter is applied. refIdx represents an index of a reference pixel line. For reference pixels at a top position of a current block, 'a' may have a value between (−1−refIdx)

and (refW−1) and 'b' may have a value of (−1−refIdx). As refW represents the number of reference pixels in a horizontal direction, it may be set as 2nTbW or (nTbW+nTbH). For reference pixels at a left position of a current block, 'a' may have a value of (−1−refIdx) and 'b' may have a value between (−1−refIdx) and (refH−1). As refH represents the number of reference pixels in a vertical direction, it may be set as 2nTbH or (nTbW+nTbH).

In other words, reference pixels arranged in a 2D shape may be rearranged in a reference pixel buffer in a 1D shape.

A reference pixel used to derive a prediction pixel at a position of (x, y) may be specified based on at least one of a prediction angle, intraPredAngle, or a variable, invAngle. In an example, when a value of a variable, intraPredAngle, is smaller than 0, ref[x], a reference pixel used to derive a prediction pixel at a position of (x, y), may be derived based on the following Equation 5.

ref[x]=p[−1−refIdx][−1−refIdx+Min((x*invAngle+256)>>9,nTbH)], with =−nTbH . . . −1  [Equation 5]

On the other hand, when a value of a prediction angle, intraPredAngle, is equal to or greater than 0, ref[x], a reference pixel used to derive a prediction pixel at a position of (x, y), may be derived based on the following Equation 6.

ref[x]=p[−1−refIdx+x][−1−refIdx], with x=−nTbW+2+refIdx . . . refW+refIdx  [Equation 6]

In this case, a value of ref[refW+refIdx+x], a reference pixel buffer that a value of x is between 1 and (Max(1, nTbW/nTbH)*refIdx+1), may be set the same as p[−1+refW][−1−refIdx].

Next, iIdx, a variable for specifying a reference pixel in a reference pixel buffer, and iFact, a variable representing a position of a fractional pixel, may be derived. In an example, Equation 7 and Equation 8 represent an example of deriving the two variables.

iIdx=(((y+1+refIdx)*intraPredAngle)>>5)+refIdx  [Equation 7]

iFact=(((y+1+refIdx)*intraPredAngle)&31  [Equation 8]

When an interpolation filter is used, a prediction pixel may be derived by interpolating reference pixels according to a selected interpolation filter type. In this case, according to a color component, filter coefficients may be differently determined.

In an example, for a luma component, a filter coefficient, fT[j], may be determined as in the following Equation 9.

fT[j]=filterFlag?fG[iFact][j]:fC[iFact][j]  [Equation 9]

When a 4-tap interpolation filter is used, j may be set as a value between 0 and 3. fG represents a filter coefficient of a Gaussian filter and fC represents a filter coefficient of a Cubic-convolution filter.

Filter coefficients of each filter type may be pre-stored in an encoder and a decoder. In an example, Table 3 represents filter coefficients of each filter type.

TABLE 3

| Fractional sample position p | fC interpolation filter coefficients | | | | fG interpolation filter coefficients | | | |
|---|---|---|---|---|---|---|---|---|
| | $f_C[p][0]$ | $f_C[p][1]$ | $f_C[p][2]$ | $f_C[p][3]$ | $f_G[p][0]$ | $f_G[p][1]$ | $f_G[p][2]$ | $f_G[p][3]$ |
| 0  | 0  | 64 | 0  | 0  | 16 | 32 | 16 | 0  |
| 1  | −1 | 63 | 2  | 0  | 16 | 32 | 16 | 0  |
| 2  | −2 | 62 | 4  | 0  | 15 | 31 | 17 | 1  |
| 3  | −2 | 60 | 7  | −1 | 15 | 31 | 17 | 1  |
| 4  | −2 | 58 | 10 | −2 | 14 | 30 | 18 | 2  |
| 5  | −3 | 57 | 12 | −2 | 14 | 30 | 18 | 2  |
| 6  | −4 | 56 | 14 | −2 | 13 | 29 | 19 | 3  |
| 7  | −4 | 55 | 15 | −2 | 13 | 29 | 19 | 3  |
| 8  | −4 | 54 | 16 | −2 | 12 | 28 | 20 | 4  |
| 9  | −5 | 53 | 18 | −2 | 12 | 28 | 20 | 4  |
| 10 | −6 | 52 | 20 | −2 | 11 | 27 | 21 | 5  |
| 11 | −6 | 49 | 24 | −3 | 11 | 27 | 21 | 5  |
| 12 | −6 | 46 | 28 | −4 | 10 | 26 | 22 | 6  |
| 13 | −5 | 44 | 29 | −4 | 10 | 26 | 22 | 6  |
| 14 | −4 | 42 | 30 | −4 | 9  | 25 | 23 | 7  |
| 15 | −4 | 39 | 33 | −4 | 9  | 25 | 23 | 7  |
| 16 | −4 | 36 | 36 | −4 | 8  | 24 | 24 | 8  |
| 17 | −4 | 33 | 39 | −4 | 8  | 24 | 24 | 8  |
| 18 | −4 | 30 | 42 | −4 | 7  | 23 | 25 | 9  |
| 19 | −4 | 29 | 44 | −5 | 7  | 23 | 25 | 9  |
| 20 | −4 | 28 | 46 | −6 | 6  | 22 | 26 | 10 |
| 21 | −3 | 24 | 49 | −6 | 6  | 22 | 26 | 10 |
| 22 | −2 | 20 | 52 | −6 | 5  | 21 | 27 | 11 |
| 23 | −2 | 18 | 53 | −5 | 5  | 21 | 27 | 11 |
| 24 | −2 | 16 | 54 | −4 | 4  | 20 | 28 | 12 |
| 25 | −2 | 15 | 55 | −4 | 4  | 20 | 28 | 12 |
| 26 | −2 | 14 | 56 | −4 | 3  | 19 | 29 | 13 |
| 27 | −2 | 12 | 57 | −3 | 3  | 19 | 29 | 13 |
| 28 | −2 | 10 | 58 | −2 | 2  | 18 | 30 | 14 |
| 29 | −1 | 7  | 60 | −2 | 2  | 18 | 30 | 14 |
| 30 | 0  | 4  | 62 | −2 | 1  | 17 | 31 | 15 |
| 31 | 0  | 2  | 63 | −1 | 1  | 17 | 31 | 15 |

When filter coefficients are determined, a prediction pixel may be derived based on the following Equation 10.

predSamples[x][y]=Clip1(((Σ$_{i=0}^{3}$fT[i]*ref[x+iIdx+i]+32)>>6)  [Equation 10]

For a chroma component, whether an interpolation filter will be used may be determined based on a variable, iFact. In an example, when a variable, iFact, indicates an integer position (i.e., when a value of iFact is 0), a prediction pixel may be derived based on the following Equation 11.

$$predSamples[x][y]=ref[x+iIdx+1] \quad \text{[Equation 11]}$$

On the other hand, when a variable, iFact, indicates a fractional position (i.e., when a value of iFact is not 0), a prediction pixel may be derived based on the following Equation 12.

$$predSamples[x][y]=((32-iFact)*ref[x+iIdx+1]+ \\ iFact*ref[x+iIdx+2]+16)>>5 \quad \text{[Equation 12]}$$

Next, a method of deriving a prediction pixel will be described when an intra prediction mode of a current block is smaller than an index in a top-left diagonal direction (i.e., when predModeIntra is smaller than 34). In this case, a reference pixel buffer may be defined as follows.

$$ref[x]=p[-1-refIdx][-1-refIdx+x], \text{ with } x=0 \ldots \\ nTbH+refIdx+15 \quad \text{[Equation 13]}$$

In this case, when intraPredAngle, a variable representing a prediction angle, is smaller than 0, a reference pixel buffer, ref[x], may be extended as in Equation 14.

$$ref[x]=p[-1-refIdx+Min((x*invAngle+256)>>9, \\ nTbW)][-1-refIdx], \text{ with } x=-nTbW \ldots -1 \quad \text{[Equation 14]}$$

On the other hand, when intraPredAngle, a variable representing a prediction angle, is greater than 0, a reference pixel buffer, ref[x], may be extended as in Equation 15.

$$ref[x]=p[-1-refIdx][-1-refIdx+x], \text{ with } x=nTbH+2+ \\ refIdx \ldots refH+refIdx \quad \text{[Equation 15]}$$

In this case, a value of ref[refH+refIdx+x], a reference pixel buffer that a value of x is between 1 and (Max(1, nTbH/nTbW)*refIdx+1), may be set the same as p[−1−refIdx][−1+refH].

And, a variable, iIdx, and a variable, iFact, may be derived based on the following Equation 16 and Equation 17.

$$iIdx=(((x+1+refIdx)*intraPredAngle)>>5)+refIdx \quad \text{[Equation 16]}$$

$$iFact=(((x+1+refIdx)*intraPredAngle)\&31 \quad \text{[Equation 17]}$$

When an interpolation filter is used, a prediction pixel may be derived by interpolating reference pixels according to a selected interpolation filter type. In this case, according to a color component, filter coefficients may be differently determined.

In an example, for a luma component, a filter coefficient, fT[j], may be determined as in an example of Equation 8.

When a filter coefficient is determined, a prediction pixel may be derived based on the following Equation 18.

$$predSamples[x][y]=Clip1(((predSamples[x][y]=Clip1 \\ (((\Sigma_{i=0}^{3}fT[i]*ref[y+iIdx+i]+32)>>6) \quad \text{[Equation 18]}$$

For a chroma component, whether an interpolation filter will be used or not may be determined based on a variable, iFact. In an example, when a variable, iFact, indicates an integer position (i.e., when a value of iFact is 0), a prediction pixel may be derived based on the following Equation 19.

$$predSamples[x][y]=ref[y+Idx+1] \quad \text{[Equation 19]}$$

On the other hand, when a variable, iFact, indicates a fractional position (i.e., when a value of iFact is not 0), a prediction pixel may be derived based on the following Equation 20.

$$predSamples[x][y]=((32-iFact)*ref[y+iIdx+1]+ \\ iFact*ref[y+iIdx+2]+16)>>5 \quad \text{[Equation 20]}$$

In the above-described example, it was illustrated that invAngle, a variable for specifying a storage position of a reference pixel in a reference pixel buffer, is derived based on intraPredAngle, a variable representing a prediction angle. But, in the present disclosure, a process in which a variable, invAngle, is derived may be omitted for a specific intra prediction mode. In an example, when a variable, intraPredAngle, has a preset value or belongs to a predefined range, a process of deriving a variable, invAngle, (e.g., Equation 3) may be omitted. In this case, a preset value may be an integer such as 0, 1 or 2 and a predefined range may be set to be 0, −1~1 or −2~2, etc.

In other words, the above-described Equation 3 may be performed only when a variable, intraPredAngle, does not have a preset value or when an absolute value of a variable, intraPredAngle, is greater than a preset constant value.

When a process of deriving a variable, invAngle, is omitted, a procedure of using a variable, invAngle, in a procedure of deriving a prediction sample may be set not to be performed or a procedure of using a variable, invAngle, may be performed by setting a variable, invAngle, as a default value (e.g., 0).

In another example, after a variable, invAngle, is initialized to a default value, whether a value of a variable, invAngle, will be updated or not may be determined based on at least one of PredModeIntra, an index of an intra prediction mode, and intraPredAngle, a prediction angle of an intra prediction mode. In this case, a default value of a variable, invAngle, may be an integer such as 0, 1 or 2.

In an example, when a variable, intraPredAngle, has a preset value or belongs to a predefined range, a value of a variable, invAngle, may not be updated. On the other hand, when a variable, intraPredAngle, is not a preset value or when an absolute value of a variable, intraPredAngle, is greater than a preset value, a value of a variable, invAngle, may be updated. In this case, a preset value may be an integer such as 0, 1 or 2 and a predefined range may be set to be 0, −1~1 or −2~2, etc.

When embodiments described based on a decoding process or an encoding process are applied to an encoding process or a decoding process, it is included in a range of the present disclosure. When embodiments described in a predetermined order are changed in an order different from a description, it is also included in a range of the present disclosure.

The above-described embodiment is described based on a series of stages or flow charts, but it is not limited to a time series order of the present disclosure and if necessary, it may be performed at the same time or in a different order. In addition, each component (e.g., a unit, a module, etc.) configuring a block diagram in the above-described embodiment may be implemented as a hardware device or a software and a plurality of components may be combined and implemented as one hardware device or software. The above-described embodiment may be recorded in a computer readable recoding medium by being implemented in a shape of a program instruction which may be performed by a variety of computer components. The computer readable recoding medium may include a program instruction, a data file, a data structure, etc. alone or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in an example of a computer readable recoding medium. The hardware device may be configured to operate as one or more software modules in order to perform processing according to the present disclosure and vice versa.

INDUSTRIAL APPLICABILITY

The present disclosure may be used for encoding/decoding a video signal.

What is claimed is:

1. A method of decoding a video, the method comprising:
   determining a reference pixel line of a current block;
   determining an intra prediction mode of the current block; and
   deriving a prediction sample of the current block based on the intra prediction mode and a reference pixel,
   wherein a one-dimensional reference pixel array composed of reference pixels in the reference pixel line is generated either by or without using an inverse-angle variable of the intra prediction mode, the inverse-angle variable being derived based on a prediction angle of the intra prediction mode,
   wherein the reference pixel is specified from the one-dimensional reference pixel array based on the prediction angle of the intra prediction mode,
   wherein in response to the prediction angle of the intra prediction mode having a predefined value, deriving the inverse-angle variable of the intra prediction mode is omitted, and the one-dimensional reference pixel array is generated without using the inverse-angle variable of the intra prediction mode, and
   wherein the predefined value is 0.

2. A method of encoding a video, the method comprising:
   determining a reference pixel line of a current block;
   determining an intra prediction mode of the current block; and
   deriving a prediction sample of the current block based on the intra prediction mode and a reference pixel,
   wherein a one-dimensional reference pixel array composed of reference pixels in the reference pixel line is generated either by or without using an inverse-angle variable of the intra prediction mode, the inverse-angle variable being derived based on a prediction angle of the intra prediction mode,
   wherein the reference pixel is specified from the one-dimensional reference pixel array based on the prediction angle of the intra prediction mode,
   wherein in response to the prediction angle of the intra prediction mode having a predefined value, deriving the inverse-angle variable of the intra prediction mode is omitted and the one-dimensional reference pixel array is generated without using the inverse-angle variable of the intra prediction mode, and
   wherein the predefined value is 0.

3. A non-transitory computer readable medium storing a bitstream, the bitstream being encoded by an image encoding method comprising:
   determining a reference pixel line of a current block;
   determining an intra prediction mode of the current block; and
   deriving a prediction sample of the current block based on the intra prediction mode and a reference pixel,
   wherein a one-dimensional reference pixel array composed of reference pixels in the reference pixel line is generated either by or without using an inverse-angle variable of the intra prediction mode, the inverse-angle variable being derived based on a prediction angle of the intra prediction mode,
   wherein the reference pixel is specified from the one-dimensional reference pixel array based on the prediction angle of the intra prediction mode,
   wherein in response to the prediction angle of the intra prediction mode having a predefined value, deriving the inverse-angle variable of the intra prediction mode is omitted and the one-dimensional reference pixel array is generated without using the inverse-angle variable of the intra prediction mode, and
   wherein the predefined value is 0.

* * * * *